Patented July 4, 1939

2,164,568

UNITED STATES PATENT OFFICE 2,164,568

PARASITICIDAL COMPOUND AND METHOD OF PRODUCING THE SAME

Ralph N. Chipman, Plainfield, and Frank J. Seibert, Bound Brook, N. J., assignors to Chipman Chemical Company, Inc., Bound Brook, N. J., a corporation of New York No Drawing. Application February 25, 1937, Serial No. 127,770

11 Claims. (Cl. 167—15)

This invention relates to a parasiticidal composition and method of producing the same, and more particularly to a parasiticide containing copper and arsenic.

It has long been known that cupric acetoarsenites and other copper arsenites, generally classified under the term "Paris green", are highly effective as insecticides against certain insects and, presumably because of the copper content, have also considerable fungicidal value.

Attempts have been made to add calcium arsenate to copper arsenical compounds of the Paris green type, the end in view being an insecticide applicable to the destruction of a wider range of insects and a decrease in total cost of materials. These attempts, however, were for some time unsuccessful, largely for the reason that the two compounds tended to separate upon application. This was more particularly the case when the mixture was applied in dust form by the usual air dusting apparatus, the Paris green falling on one spot and the calcium arsenate on another.

This disadvantage, however, has been overcome by the compound and method of making the same disclosed in United States Patent 1,883,188, granted October 18, 1932, to B. P. Webster. This patent discloses a composition of Paris green and calcium arsenate that is relatively light and fine and that is substantially inseparable mechanically, for example, when applied by dusting.

While the invention of said patent solves the problem of preventing mechanical separation, it has been found that the percentage of water-soluble arsenic which necessarily exists in the product made according to the patented process, representing largely the combined water-soluble characteristics of the two mixed compounds, is somewhat higher than is desirable. Moreover, this water-soluble arsenic content is unstable and tends to increase materially with the lapse of time, because of decomposition or otherwise.

It is an object of the present invention to provide a parasiticidal composition which will combine the valuable properties of arsenical-copper compounds of the Paris green type and calcium arsenate and which, at the same time, will avoid the disadvantages of previously known compounds of that type.

More particularly, it is an object of the invention to provide a composition having the insecticidal and mechanical advantages of the product of said Patent 1,883,188 but which has a lower percentage of water-soluble arsenic and in which the water-soluble arsenic content is relatively stable, i. e., will not substantially increase in proportion, with the lapse of time.

It is a further object of the invention to provide a composition of the type mentioned, in which the copper-arsenic content may be varied in manufacture by differences in the proportions of the starting materials, without materially increasing the percentage of water-soluble arsenic or materially affecting the stability or fineness of the final product.

Other objects and advantages of the invention will be apparent to those skilled in the art from the ensuing description.

According to the present invention, we form a liquid mixture of Paris green, calcium arsenate, an alkali or alkaline compound and water. One of the essential features of the invention in its entirety consists in subjecting the Paris green, in the presence of water and an alkaline compound, to a temperature in excess of approximately 150° F. but not in substantial excess of 250° F. While the alkaline compound may be supplied in various ways, in carrying out the invention to what is now considered the best advantage, we utilize, for the desired alkaline constituent, a limited amount of free lime. Since commercial calcium arsenate ordinarily carries an excess of free lime sufficient for the purposes of the invention, we find it convenient and advantageous to use such arsenate as a starting material and to utilize the excess lime therein as the source of the desired alkaline compound.

While the heating may be carried out at various stages, when the free lime is to be derived from commercial calcium arsenate, the heat is applied during or after mixing.

According to practice found to be suitable and satisfactory, we form a liquid slurry of Paris green and water and a liquid slurry of commercial calcium arsenate, containing the necessary excess of free lime, and water. While various types and forms of Paris green may be used, in carrying out the invention to what is now considered the best advantage, we use a Paris green compounded as described in said Patent 1,883,188 and/or in Patent 1,928,771.

While the relative proportions of the materials used in these two slurries may vary considerably, it is advantageous to use water in such amounts that the subsequent mixture of the two slurries contains approximately 3500 pounds of dry weight compound in 1000 gallons of mixed slurry.

The relative proportions of the Paris green and calcium arsenate may also vary within a considerable range. In general, these proportions will depend on the intended conditions and purposes of use or the cost element or both. That is, since the Paris green is a more costly ingredient than the calcium arsenate, it is more economical to use no more Paris green than is necessary for the end in view. Thus, for cotton insects, 5 to 10 parts Paris Green with 95 to 90 parts calcium arsenate, calculated on a dry weight basis, has been found suitable and satisfactory. The necessary toxicity for controlling some other insects such, for example, as codling moth and Colorado potato beetle, requires a relatively greater amount of Paris green. For such uses, therefore, the proportion of Paris green is increased and the calcium arsenate reduced accordingly. In cases where it is desired to take particular advantage of the fungicidal qualities of the copper content of the composition, the Paris green content may have to be larger in proportion than would be necessary were fungus control not involved. It is believed, however, that in no case will it be necessary to use more than 30 parts Paris green with 70 parts calcium arsenate.

The two slurries above described are then mixed under thorough agitation so as to bring the particles into intimate contact and effect an association in the nature of an interaction or amalgamation of such particles.

The combined slurries are then subjected to a temperature between approximately 150° F. and 250° F., for a period depending on conditions, as hereinafter more fully set forth. This heating may be applied during the mixing of the slurries or after mixing, for example, before or during drying or both.

While the temperature may vary within the range referred to, and while the time factor may vary, we have found that the time required for a given temperature and the temperature required for a given time, will vary as the Paris green content is varied. That is, the more Paris green there is present, the more time or the higher the temperature required, time and temperature being reciprocal. While the desired results are obtained more quickly if higher temperatures, such as from 200° to 250° F., are applied, care must be taken not to maintain these temperatures for too long a period. With a Paris green content of from 5 to 10 parts, a time and temperature relation found to give satisfactory results consists in applying a temperature of 180° to 200° F. for from 90 to 150 minutes. With larger amounts of Paris green and a temperature as low as 150° F., heat should be applied for about 3 or 3½ hours.

If the new composition is to be used as a dusting powder, the water of the combined slurries is eventually eliminated to produce a substantially dry compound. While this may be accomplished in various ways, in carrying out the invention to what is now considered the best advantage, the combined slurry is directly dried, that is, dried without any intermediate filter pressing or the like. This may be accomplished in any suitable manner, for example, by means of drying drums.

The heating step above described may be carried on in connection with the drying operation. That is, the heat of drying may be utilized as part or all of the heat application required. It is important, however, that the heat treatment, other than for drying purposes, be conducted while the ingredients are in the presence of water. Consequently, the requisite heating interval should be completed prior to complete dehydration and advantageously prior to dehydration beyond approximately 50% moisture.

The dried product is then ground, as may be required, to produce the finished composition in dry form. This finished product has a density such that 65 to 100 cubic inches weigh one pound.

The new composition may be used either in the form of a dusting powder or as a liquid spray. For practical purposes, the liquid form suitable for spraying is advantageously arrived at by mixing the powdered form with water. While the proportions may vary within a considerable range, a mixture of 2 pounds dry compound to 100 gallons of water has been found suitable and satisfactory. It is also possible to obtain a liquid form of the compound suitable for spraying by diluting the combined slurries, after the heat treatment described, and without passing through a drying step.

The procedure above described may be varied without departing from the invention. For example, the Paris green may be subjected to the heat treatment mentioned, in the presence of water and an alkali or alkaline compound, prior to the mixing operation. In such case, a liquid slurry of Paris green and water is formed as before. There is added, however, an alkali or alkaline compound such, for example as lime or caustic soda. This intermediate product is then subjected to the heat treatment above described. Thereafter, such intermediate product is mixed, under agitation, with a liquid slurry of calcium arsenate and water and the mixture dried or diluted as the case may be. The procedure previously described, however, has the advantage that the free lime normally present in commercial calcium arsenate is utilized, thus avoiding the use of an additional starting material.

The compound of the present invention is a new composition that differs from the product of Patent 1,883,188 both chemically and physically. It will be apparent to those skilled in the art that it is difficult, if not impossible, to determine accurately the chemical constitution of the finished product. But the existence of a fundamental difference over the product of said patent is apparent without chemical analysis. For example, in view of the fact that the product of Patent 1,883,188 retains the green color typical of Paris green, it is apparent that the Paris green content remains substantially unchanged. In the new composition of the present invention, however, this typical green color disappears and the compound has a characteristic buff or orange color. This indicates that the Paris green has been appreciably altered by hydration or chemical combination. It is also indicated as probable that there is formed a hydrated copper arsenite or a complex hydrated copper-calcium arsenite or aceto-arsenite.

The new composition is more effective than previously known compounds when used as a dusting powder. It is not only substantially inseparable upon being air dusted, but compared with calcium arsenate or the product of Patent 1,883,188 it is more free flowing. It will float in the air and remain suspended a longer time. As a result of these characteristics, the compound can be dusted by means of mechanical dusting apparatus with a degree of uniformity not hitherto possible. Moreover, it is possible to attain a much higher degree of penetration to the hidden parts of plants where insects are likely to seek refuge. In addition, the new composition has an increased toxic efficiency, as compared with ordinary mixtures of calcium arsenate and Paris green or the product of Patent 1,883,188, particularly as respects cotton boll worm, cotton leaf worm and the adult fleahopper.

Another important advantage of the new composition is that the water-soluble arsenic content is relatively low and is substantially stable, i. e., does not materially increase with the lapse of time. As a result, the new composition is relatively safer than previously known copper arsenical compounds in that there is much less danger of burning or otherwise injuring many forms of vegetation and particularly the more delicate forms, such as fruit trees and ground crops. Moreover, these characteristics of low, stabilized water-soluble arsenic content make the compound particularly advantageous as a liquid spray. Not only has the compound insecticidal qualities in spray form, but, in addition, the copper content will control fungus growths and contribute to plant stimulation.

An additional advantage of the invention is in the matter of costs. The elmination of filter pressing eliminates one manufacturing step and thus reduces the cost of drying.

What is claimed is:

1. The process of producing a parasiticide, which comprises forming a mixture containing Paris green, calcium arsenate and an alkaline-earth hydroxide and subjecting such mixture, in the presence of water, to a temperature of between approximately 150° F. and approximately 250° F.

2. The process of producing a parasiticide, which comprises forming a mixture containing Paris green, calcium arsenate and lime and subjecting such mixture, in the presence of water, to a temperature of between approximately 150° F. and approximately 250° F.

3. The process of producing a parasiticide, which comprises forming a mixture of Paris green and commercial calcium arsenate, containing an excess of free lime, and subjecting such mixture, in the presence of water, to a temperature of between approximately 150° F. and approximately 250° F.

4. The process of producing a parasiticide, which comprises forming a mixture containing Paris green, calcium arsenate, an alkaline-earth hydroxide and water, drying said mixture and, during some portion of the process prior to completion of the drying, subjecting the mixture to a temperature of between approximately 150° F. and approximately 250° F.

5. As a new composition of matter, a parasiticidal compound comprising the reaction products resulting from subjecting Paris green, calcium arsenate and an alkaline-earth hydroxide to a reaction temperature of from approximately 150° F. to approximately 250° F. in the presence of water, said compound being characterized by a relatively high degree of stability with respect to water-soluble arsenic content.

6. As a new composition of matter, a parasiticidal compound comprising the reaction products resulting from subjecting Paris green, calcium arsenate and lime to a reaction temperature of from approximately 150° F. to approximately 250° F. in the presence of water, said compound being characterized by a relatively high degree of stability with respect to water-soluble arsenic content.

7. The process of producing a parasiticide, which comprises forming a mixture containing Paris green, commercial calcium arsenate, containing an excess of free lime, a water-soluble alkaline compound selected from the group consisting of the alkalis and alkaline earths, and water, and subjecting, during some portion of the process, such intermediate product as may then contain at least the Paris green, the said alkaline compound and the water, to a temperature of between approximately 15° F. and approximately 250° F.

8. The process of producing a parasiticide, which comprises forming a mixture containing Paris green, a water-soluble alkaline compound selected from the group consisting of the alkalis and alkaline earths, and water, subjecting such mixture to a temperature of between approximately 150° F. and approximately 250° F., and adding commercial calcium arsenate containing an excess of free lime.

9. The process of producing a parasiticide, which comprises forming a mixture containing Paris green, commercial calcium arsenate, containing an excess of free lime, a water-soluble alkaline compound selected from the group consisting of the alkalis and alkaline earths, and subjecting such mixture, in the presence of water, to a temperature of between approximately 150° F. and approximately 250° F.

10. As a new composition of matter, a parasiticidal compound comprising the reaction products resulting from subjecting Paris green, commercial calcium arsenate, containing an excess of free lime, and a water-soluble alkaline compound selected from the group consisting of the alkalis and alkaline earths to a reaction temperature of between approximately 150° F. and approximately 250° F. in the presence of water, said compound being characterized by a relatively high degree of stability with respect to water-soluble arsenic content.

11. The process of producing a parasiticide which comprises forming a mixture containing Paris green, an alkaline-earth hydroxide and water, subjecting such mixture to a temperature of between approximately 150° F. and approximately 250° F., and adding calcium arsenate.

RALPH N. CHIPMAN.
FRANK J. SEIBERT.

CERTIFICATE OF CORRECTION.

Patent No. 2,164,568.  July 4, 1939.

RALPH N. CHIPMAN, ET AL.

It is hereby certified that error appears in the printed specification of the above numbered patent requiring correction as follows: Page 3, second column, line 20, claim 7, for "15° F." read 150° F.; and that the said Letters Patent should be read with this correction therein that the same may conform to the record of the case in the Patent Office.

Signed and sealed this 15th day of August, A. D. 1939.

Leslie Frazer (Seal)  Acting Commissioner of Patents.